United States Patent
Morita et al.

[11] Patent Number: 5,094,896
[45] Date of Patent: Mar. 10, 1992

[54] MAGNETIC RECORDING MEDIUM COMPRISING A GLASS SUBSTRATE HAVING A MAGNETIC THIN FILM OF $\gamma$ $Fe_2O_3$ WHICH LAYER HAS A RESISTIVITY OF FROM 0.03 TO 3 $\Omega$-CM

[75] Inventors: Haruyuki Morita; Monjiro Momoi, both of Saku; Kazumasa Fukuda, Komoro, all of Japan

[73] Assignee: TDK Corporation, Tokyo, Japan

[21] Appl. No.: 514,964

[22] Filed: Apr. 26, 1990

[51] Int. Cl.⁵ .............................................. G11B 23/00
[52] U.S. Cl. ............................................ 428/64; 428/65; 428/409; 428/432; 428/694; 428/695; 428/900; 204/192.15; 204/192.2; 360/135; 360/103
[58] Field of Search ............. 428/694, 900, 409, 432, 428/695, 64, 65; 204/191.15, 191.2

[56] References Cited
U.S. PATENT DOCUMENTS 4,232,071  11/1980  Terada et al. ...................... 428/64
4,704,199  11/1987  Yokokawa et al. ................ 204/298
4,920,014   4/1990  Hirai et al. .......................... 428/698
4,975,324  12/1990  Torii et al. .......................... 428/329

FOREIGN PATENT DOCUMENTS 62-43819  3/1987  Japan .
63-175219  4/1988  Japan .

Primary Examiner—Merrell C. Cashion, Jr.
Assistant Examiner—Stevan A. Resan
Attorney, Agent, or Firm—Oblon, Spivak, McClelland, Maier & Neustadt

[57] ABSTRACT

A magnetic recording disk comprising a rigid substrate and a magnetic layer of the continuous thin film type is durable and exhibits good electromagnetic properties and frequency response when the magnetic layer is predominantly composed of $\gamma$-$Fe_2O_3$ and has a resistivity of 0.03 to 3 $\Omega$-cm. Reliable recording/reproduction can be conducted on the magnetic recording disk using a flying magnetic head.

11 Claims, 4 Drawing Sheets

MAGNETIC RECORDING MEDIUM COMPRISING A GLASS SUBSTRATE HAVING A MAGNETIC THIN FILM OF γ FE$_2$O$_3$ WHICH LAYER HAS A RESISTIVITY OF FROM 0.03 TO 3 Ω-CM

CROSS-REFERENCE TO RELATED APPLICATIONS

Reference is made to copending U.S. Ser. No. 354,375 filed May 19, 1989 for "Magnetic Recording Medium, Method for Making, and Magnetic Recording/Reproducing System Using the Same" and copending U.S. application Ser. No. 07/541524 filed June 21, 1990, for "Magnetic Recording Medium and Magnetic Recording/ Reproducing Method," both assigned to the same assignee as the present invention.

FIELD OF THE INVENTION

This invention relates to a magnetic recording medium of the hard type having a magnetic layer on a rigid substrate and more particularly, to such a magnetic recording medium of the hard type having a magnetic layer of the continuous thin film type based on gamma-iron oxide. It also relates to a system for recording and reproducing information in such a magnetic recording medium using a flying magnetic head.

BACKGROUND OF THE INVENTION

Magnetic recording/reproducing equipment for computers or the like generally drives a magnetic disk of the hard type having a magnetic layer on a rigid substrate relative to a flying magnetic head for magnetic recording/reproducing purposes.

Most magnetic disks used in the past were of the coating type. To meet a demand for increasing the capacity of magnetic disks, magnetic disks of the thin film type now find increasing use. The thin film type magnetic disks have a magnetic thin film, also known as a continuous thin film, which is formed by vapor phase deposition techniques such as sputtering. They have excellent magnetic properties and increased recording density.

The thin film type magnetic disks most often use modified substrates including aluminum alloy substrates having an Ni-P undercoat layer plated thereon or a hard oxide layer formed by anodization. A Cr under layer, a metallic magnetic layer such as a Co-Ni layer and a protective lubricant layer of carbon or the like are consecutively deposited on the substrate as by sputtering. However, a reliability problem arises because the metallic magnetic layer such as Co-Ni is liable to corrosion and less hard. On the contrary, Japanese Patent Application Kokai Nos. 43819/1987 and 175219/1988 disclose a magnetic thin film based on iron oxide which is chemically stable, resistant against corrosion, and hard enough.

The flying magnetic head has a slider which generates flying forces in an air bearing fashion. The flying magnetic head is generally classified into the composite type in which a core is integrated with the slider and the monolithic type in which a core also serves as the slider.

For maximum density recording, flying thin film magnetic heads have been used in practice. The flying thin film magnetic heads have magnetic pole, gap, coil and other necessary layers formed on a nonmagnetic base by vapor phase deposition, wet plating and other techniques. In these flying thin film heads, the base plays the role of a slider.

A magnetic disk equipment drives a magnetic disk relative to a flying magnetic head in a contact start and stop (CSS) manner so that an impact is applied to the magnetic layer of the disk upon starting and stopping because the floating surface of the magnetic head (or the surface of the slider facing the magnetic disk) rests on the magnetic disk before and after the operation. This tendency is aggravated particularly when a flying thin film magnetic head is used. The magnetic layer undergoes more impact upon CSS because the spacing or flying height between the magnetic disk and the magnetic head is minimized for high density recording.

The minimized flying height leaves a risk of accidental contact between the magnetic disk and the flying magnetic head during operation due to vibration of the magnetic disk or any externally applied impact.

A magnetic disk having an iron oxide base magnetic thin film as disclosed in Japanese Patent Application Kokai Nos. 43819/1987 and 175219/1988 uses a glass substrate having a mirror finished surface so that the magnetic layer has a surface roughness (Rmax) as low as up to 100 Å. The magnetic disk of this type allows the flying height to be set minimal although the magnetic layer would be more severely damaged if undesired accidental contact occurred between the disk and the head upon CSS or during operation.

Japanese Patent.Application Kokai Nos. 43819/1987 and 175219/1988, however, do not refer to the durability of the magnetic layer. No effective proposal for increasing the durability of an iron oxide base magnetic layer of the continuous thin film type is available as far as the inventors know.

The inventors have proposed a magnetic recording medium in which the surface roughness (Rmax) of a glass substrate on its surface is limited to a specific range as well as the surface roughness (Rmax) of the medium in U.S. Ser. No. 354,375 filed May 19, 1989 and a magnetic recording medium in which the area proportion of specific peaks of γ-Fe$_2$O$_3$ in the magnetic layer is limited and α-Fe$_2$O$_3$ is additionally introduced in the magnetic layer in copending U.S. application filed Ser. No. 514,401 filed Apr. 26, 1990.

Since the general demand for high density recording is toward minimization of the flying height, there is a need for a magnetic recording medium having higher CSS durability. A minimized loss of electromagnetic properties at higher frequencies, that is, a flatter frequency response is desired for high density recording.

SUMMARY OF THE INVENTION

Therefore, a primary object of the present invention is to provide a novel and improved magnetic recording medium having a magnetic layer of the continuous thin film type predominantly comprising γ-Fe$_2$O$_3$ on a rigid substrate which features improved durability.

Another object is to provide such a magnetic recording medium having improved electromagnetic properties and improved frequency response thereof.

A further object is to provide a reliable method for magnetic recording and reproducing information in such a magnetic recording medium using a flying magnetic head.

The present invention provides a magnetic recording medium comprising a rigid substrate having a pair of opposed major surfaces and a magnetic layer of the continuous thin film type on at least one major surface predominantly comprising $\gamma$-Fe$_2$O$_3$. According to the present invention, the magnetic layer has a resistivity in the range of from 0.03 to 3 $\Omega$-cm.

Preferably, the peak corresponding to an index of plane (311) of $\gamma$-Fe$_2$O$_3$ appears at an angle of from 35.43° to 35.80° in an X-ray diffraction chart of the magnetic layer. More preferably, the magnetic layer meets the following conditions:

$$0 \leq P(400)/P(311) \leq 1.0 \text{ and}$$

$$0 \leq P(222)/P(311) \leq 0.5$$

wherein P(311), P(400), and P(222) are peak areas at indexes of plane (311), (400) and (222) of $\gamma$-Fe$_2$O$_3$ in an X-ray diffraction chart of the magnetic layer.

Preferably, the magnetic layer has an average grain diameter of from 100 to 800 Å.

In one preferred embodiment, the magnetic layer further contains $\alpha$-Fe$_2$O$_3$. More preferably, the content of $\alpha$-Fe$_2$O$_3$, is higher on a side remote from the substrate than on a side adjacent to the substrate. Also preferably, the magnetic layer meets the following conditions:

$$0.02 \leq P(104)/P(311) - 0.20,$$

$$0 \leq P(400)/P(311) \leq 1.0, \text{ and}$$

$$0 \leq P(222)/P(311) \leq 0.5$$

wherein P(311), P(400), and P(222) are peak areas at indexes of plane (311), (400) and (222) of $\gamma$-Fe$_2$O$_3$ and P(104) is a peak area at an index of plane (104) of $\alpha$-Fe$_2$O$_3$ in an X-ray diffraction chart of the magnetic layer.

In another preferred embodiment, the magnetic layer further contains cobalt.

Preferably, the substrate is formed of glass.

Preferably, the substrate has a surface roughness (Rmax) in the range of from 10 to 100 Å on the one major surface and the magnetic recording medium has a surface roughness (Rmax) in the range of from 50 to 200 Å on an outer surface adjacent to the magnetic layer.

Preferably, a lubricating layer containing an organic compound is formed on the magnetic layer.

The present invention also provides a method for recording and reproducing information in a magnetic recording medium as defined above, comprising the step of rotating the magnetic recording medium in close proximity to a flying magnetic head. According to the feature of the invention, the magnetic recording medium is of disk shape and the flying magnetic head is kept at a spacing of up to 0.2 $\mu$m from the rotating magnetic disk.

The magnetic recording medium of the present invention is highly durable since the magnetic layer of the continuous thin film type which is based on $\gamma$-Fe$_2$O$_3$ has a resistivity $\rho$ in the range of from 0.03 to 3 $\Omega$-cm. The resistivity $\rho$ is correlated to the peak position at index of plane (311) of $\gamma$-Fe$_2$O$_3$. The peak corresponding to the index of plane (311) of $\gamma$-Fe$_2$O$_3$ usually appears at an angle of from 35.43° to 35.80° in an X-ray diffraction chart.

Also there is a correlation between the resistivity $\rho$ and the coercive force Hc of the magnetic layer. The coercive force Hc increases as the resistivity $\rho$ increases.

With a resistivity $\rho$ in the above-defined range, the magnetic layer has a coercive force which can be increased up to 6 times that of conventional $\gamma$-Fe$_2$O$_3$ or conventional Co-containing $\gamma$-Fe$_2$O$_3$. Then the recording density D70 at which the reproduction output is lowered to 70% can be improved 2.5 times as compared with D70 achievable in the prior art.

The magnetic recording medium of the invention ensures high density recording with improved CSS durability.

Prior art $\gamma$-Fe$_2$O$_3$ based magnetic layers of the continuous thin film type usually have a resistivity $\rho$ in the range of from about 10$^2$ to 10$^3$ $\Omega$-cm when formed by the direct method (to be described later) as reported in Densi Tusin Gakkai Ronbun.Si (Journal of the Japanese Electronic Communications Society), '82/1, Vol. J65.C, No. 1, pages 24-31. These reported resistivity values of $\gamma$-Fe$_2$O$_3$ based magnetic layers are extremely higher than the resistivity defined in the present invention. It is believed that the $\gamma$-Fe$_2$O$_3$ used in the present invention has a substantially lower degree of oxidation than in the prior art.

The magnetic layer of the magnetic recording medium of the invention may be formed typically by directly depositing Fe$_3$O$_4$ on a substrate by reactive sputtering according to the direct method, and oxidizing the Fe$_3$O$_4$ into $\gamma$-Fe$_2$O$_3$. The resistivity of the magnetic layer may be readily controlled to fall within the above defined range by controlling the flow rate of Ar+O$_2$ during Fe$_3$O$_4$ deposition. In order that the resulting $\gamma$-Fe$_2$O$_3$ based magnetic layer has a resistivity $\rho$ within the above-defined range, the Fe$_3$O$_4$ deposit should usually have a resistivity $\rho$ of about 10$^{-4}$ to 10$^{-1}$ $\Omega$-cm prior to oxidation. These values are extremely lower than the resistivity $\rho$ of prior art directly formed Fe$_3$O$_4$ which is reported to be of the order of 3 $\Omega$-cm in Journal of the Electronic Communications Society, '82/1, Vol. J65-C, No. 1, pages 24-31.

Durability is improved when the area ratios of the specific peaks of $\gamma$-Fe$_2$O$_3$ are selected to meet the above-defined relationship in an X-ray diffraction chart of the magnetic layer as measured by means of an X-ray diffractometer of the optical arrangement shown in FIG. 2.

With this construction, CSS durability is improved both at room temperature and at low temperatures. The magnetic layer undergoes minimized damage even when an accidental contact with the flying magnetic head occurs during operation.

The presence of $\alpha$-Fe$_2$O$_3$ in the magnetic layer contributes to a further improvement in durability. Better results are obtained when the area ratios of the specific peaks of $\alpha$-Fe$_2$O$_3$ and $\gamma$-Fe$_2$O$_3$ are selected to meet the above-defined relationship.

The inclusion of $\alpha$-Fe$_2$O$_3$ in the $\gamma$-Fe$_2$O$_3$ based magnetic layer was believed undesirable in the prior art because of a lowering of magnetic properties and recording/reproducing output. Nevertheless, for most magnetic recording media such as magnetic disks for use in computers, it is most important to ensure durability to improve reliability even despite a slight loss of reproduction output. The invention achieves improved durability without a substantial lowering of magnetic properties.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
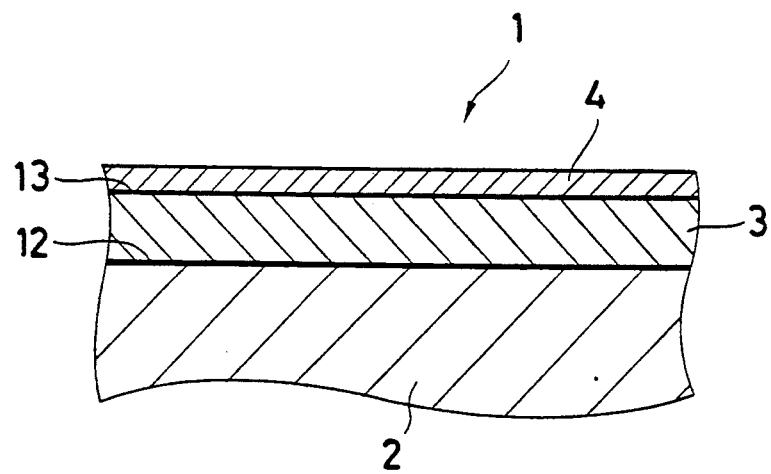
FIG. 1 is a cross section of a portion of a magnetic recording medium according to the present invention.

Referring to FIG. 1, there is illustrated at 1 a magnetic recording medium according to the present invention as comprising a substrate 2 and a magnetic layer 3 in the form of a continuous thin film. In general, the substrate is in the form of a disk and has a pair of opposed major surfaces, one of which is designated at 12. The magnetic layer 3 has a pair of opposed major surfaces, one surface in close contact with the substrate surface 12 and another surface remote from the substrate. The other or upper surface of the magnetic layer 3 is designated at 13. It is this upper surface 13 that is referred to as the surface of the magnetic thin film in this disclosure.

Substrate

The substrate used herein is most often formed of glass for the reasons that its preparation is simplified partly because the need for an undercoat layer is eliminated, that it can be readily polished to a controlled surface roughness, and that it withstands heat applied during magnetic layer formation and heat treatments for surface roughness control.

The glass used herein may preferably be tempered glass. More preferred are glasses surface tempered by chemical strengthening. In general, glass is chemically tempered by replacing alkali ions in proximity of the glass surface by alkali ions of another species from the exterior at a temperature lower than the transition temperature whereby compression stresses are induced at the glass surface by the difference in the spatial volume occupied by the ions. Ion substitution is carried out by dipping the glass in a molten alkali salt. The salt used herein may be a nitrate, sulfate or similar salt. The molten salt is at a temperature of about 350° to about 650° C. and the dipping time ranges from about 1 to about 24 hours.

More illustratively, soda glass may be strengthened by using $KNO_3$ as the molten alkali salt to thereby substitute K ions for Na ions in the glass. Lithium-containing glass may be strengthened by dipping in $NaNO_3$ to substitute Na ions for Li ions in the glass. It is also possible to simultaneously replace Na and Li ions in glass.

Since the thus strengthened or compression stressed layer is present only in proximity to the glass substrate surface, there results a surface tempered glass. The strengthened or compression stressed layer is preferably 10 to 200 $\mu$m, more preferably 50 to 150 $\mu$m thick.

Such surface tempered glasses are described in U.S. Pat. No. 3,287,200 and Japanese Patent Application Kokai Nos. 43819/1987 and 175219/1988.

The glass substrate 2 preferably has a contact angle with water of up to 20 degrees, more preferably up to 10 degrees on the major surface 12 on which the magnetic layer 3 is formed. A choice of contact angle with water to this range will improve the bond of the substrate to the iron oxide based magnetic layer of the continuous thin film type. No lower limit is imposed on the contact angle of the substrate surface although it is usually up to 2 degrees. The contact angle with water of the glass substrate may be determined, for example, by applying a drop of pure water on the glass surface and measuring the contact angle after 30 seconds in an atmosphere at 18°-23° C. and RH 40-60%.

In order that the glass substrate have a contact angle with water in the above-defined range, the glass substrate may be processed as follows. The glass substrate on the surface is first polished, tempered as previously described, and then polished again preferably to a surface roughness as defined later. The polished glass substrate is washed with pure water, and then cleaned with the sequence of steps of detergent washing→pure water rinsing→organic solvent vapor drying.

In the detergent washing step, the type of detergent is not critical. Although any detergents for general washing purposes may be used, alkaline detergents, especially weakly alkaline detergents capable of slightly etching the glass surface, for example, Extran MA01 (Merck Co.) are preferably employed. The detergent washing step is preferably carried out by immersing the glass substrate in a detergent solution at room temperature or heated to a temperature of up to about 80° C. The substrate may be kept immersed for about 1 to about 24 hours although the substrate is preferably subject to ultrasonic cleaning for about 5 to about 60 minutes.

At the end of detergent washing, the glass substrate is washed with pure water preferably by ultrasonic cleaning.

The ultrasonic cleaning used herein may be of a multiple frequency type wherein ultrasonic vibrations are induced at multiple frequencies in a certain range of 10 to 100 kHz or a fixed frequency type wherein vibrations are induced at a fixed frequency of 26 kHz or 45 kHz, for example. In either case, smaller debris can be cleaned to a larger extent with higher frequencies.

The next step is organic solvent vapor drying.

Figure 5:
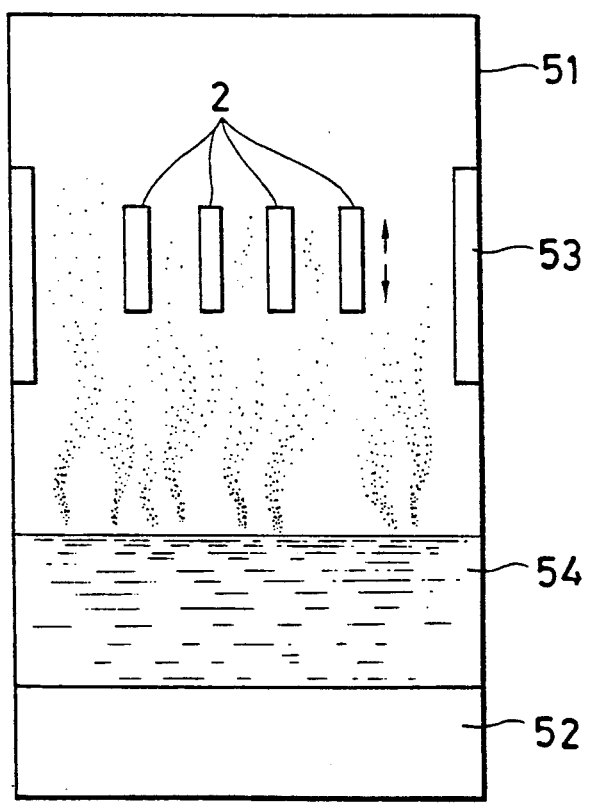
FIG. 5 is a schematic illustration of a vapor drying apparatus for glass substrates.

FIG. 5 shows a preferred vapor drying apparatus used in this step. The apparatus includes a tank 51, a heater 52 at the bottom of the tank, and a cooler 53 at a certain height on the tank wall. The tank 51 contains an appropriate volume of an organic solvent 54. An array of glass substrates 2 is held for vertical motion above the surface of the organic solvent 54 and at a height corresponding to the cooler 53.

The heater 52 heats the organic solvent 54 to evaporate into vapor. The cooler 53 causes the organic solvent vapor to cool and condense on the substrates 2. Liquid drops of organic solvent condensed on the substrates 2 then drop down from the substrates 2 toward the organic solvent bath 54.

The glass substrates 2 are kept in the vapor drying tank for about 5 to 60 minutes, completing the final washing of the glass substrates. Then, the glass substrates 2 are gradually pulled upward where the evaporating amount of organic solvent exceeds the condensing amount of organic solvent, completing drying. A very-clean surface is obtained without a drying spot since this type of vapor drying is characterized by a slow rate of drying.

The organic solvent used in the vapor drying is not critical although it is preferably selected from acetone, isopropyl alcohol (IPA), methanol, ethanol, and Fron, with the isopropyl alcohol being most preferred.

Besides the vapor drying, the final drying may be carried out by any other desired processes, for example, centrifugal spin-off drying combined with dry nitrogen blow. In this case, the pure water rinsing step is preferably followed by cleaning with an organic solvent which may be selected from those described for the vapor drying.

Brush scrub cleaning may be additionally combined with the above-mentioned steps if desired.

The glass substrate 2 on one major surface 12 preferably has a surface roughness Rmax in the range of from 10 to 100 Å, more preferably from 40 to 80 Å, most preferably from 40 to 60 Å. This range of surface roughness Rmax is not only effective in improving the durability of the associated magnetic recording medium, but also allows the medium to have a specific Rmax (to be defined later) at a surface adjacent to the magnetic layer.

It is to be noted that the surface roughness Rmax is measured according to JIS B 0601.

The surface roughness of the glass substrate may be controlled to the above-specified range, for example, by mechanochemical polishing under properly selected conditions as disclosed in Japanese Patent Application Kokai Nos. 43819/1987 and 175219/1988.

The material of the glass substrate is not critical to the present invention. A choice may be made from borosilicate glass, aluminosilicate glass, quartz glass, titanosilicate glass, and the like. Aluminosilicate glass is preferred for mechanical strength.

Crystal-free glass is preferably used when the glass substrate is surface smoothed by mechanochemical polishing as disclosed in Japanese Patent Application Kokai No. 43819/1987. Otherwise the desired Rmax range is not achievable since grain boundaries are polished relatively faster by mechanochemical polishing.

The shape and dimensions of the glass substrate are not particularly limited although it is generally of a disk shape having a thickness of about 0.5 mm to about 5 mm and a diameter of about 25 mm to about 300 mm.

Magnetic layer

On the rigid substrate is formed a magnetic layer of the continuous thin film type based on gamma-Fe$_2$O$_3$. The magnetic layer has a resistivity $\rho$ of 0.03 to 3 Ω-cm, preferably 0.1 to 0.9 Ω-cm. The resistivity or specific resistance may be measured by a well-known four-point probe method.

For a magnetic layer having a resistivity $\rho$ of 0.03 to 3 Ω-cm, a peak of $\gamma$-Fe$_2$O$_3$ in an X-ray diffraction chart corresponding to an index of plane (311) appears in the range of from 35.43° to 35.80°, preferably from 35.52° to 35.71°.

In an X-ray diffraction analysis of the magnetic layer, preferably the following conditions:

$0 \leq P(400)/P(311) \leq 1.0$ and $0 \leq P(222)/P(311) \leq 0.5$, more preferably $0 \leq P(400)/P(311) \leq 0.6$ and $0 \leq P(222)/P(311) \leq 0.3$.

are met, provided that P(311), P(400), and P(222) are peak areas at indexes of plane (311), (400) and (222) of $\gamma$-Fe$_2$O$_3$, respectively, in the X-ray diffraction chart. A magnetic layer having such specific peak area ratios is more durable.

More illustratively, an increase of P(222) implies an increase in the proportion of planes (222) and (111) that extend parallel to the magnetic layer surface. Gamma-Fe$_2$O$_3$ has a spinel structure in which plane (111) is most liable to slip motion.

If plane (222) which extends parallel to plane (111) has an increased peak area, that is, if P(222)/P(311) has an increased value, the $\gamma$-Fe$_2$O$_3$ of which the magnetic layer is formed tends to undergo slip or dislocation upon sliding contact with the magnetic head, resulting in low durability. Durability is critically lowered when the value of P(222)/P(311) exceeds 0.5.

Since plane (100) which extends parallel to plane (400) is likely to slip motion next to plane (111), durability is critically lowered if the value of P(400)/P(311) exceeds 1.

In the practice of the invention, the magnetic layer preferably contains $\alpha$-Fe$_2$O$_3$ in addition to $\gamma$-Fe$_2$O$_3$ because durability is further improved.

Preferably, the following conditions:

$0.02 \leq P(104)/P(311) \leq 0.20$, $) \leq P(400)/P(311) \leq 1.0$, and $0 \leq P(222)/P(311) \leq 0.5$, more preferably $0.05 \leq P(104)/P(311) \leq 0.15$, $0 \leq P(400/P(311) \leq 0.6$, and $0 \leq P(222)/P(311) \leq 0.3$ are met, provided that P(311), P(400), and P(222) are peak areas at indexes of plane (311), (400) and (222) of $\gamma$-Fe$_2$O$_3$, respectively, and P(104) is a peak area at an index of plane (104) of $\alpha$-Fe$_2$O$_3$ in an X-ray diffraction chart of the magnetic layer. A magnetic layer having such specific peak area ratios is more durable.

More illustratively, only a relatively low durability improvement is achieved with a P(104)/P(311) value of less than 0.02 whereas the recording/reproducing output is reduced with a P(104)/R(311) vlaue of more than 0.20.

Preferably, an X-ray diffraction chart is drawn by the following procedure.

Figure 2:
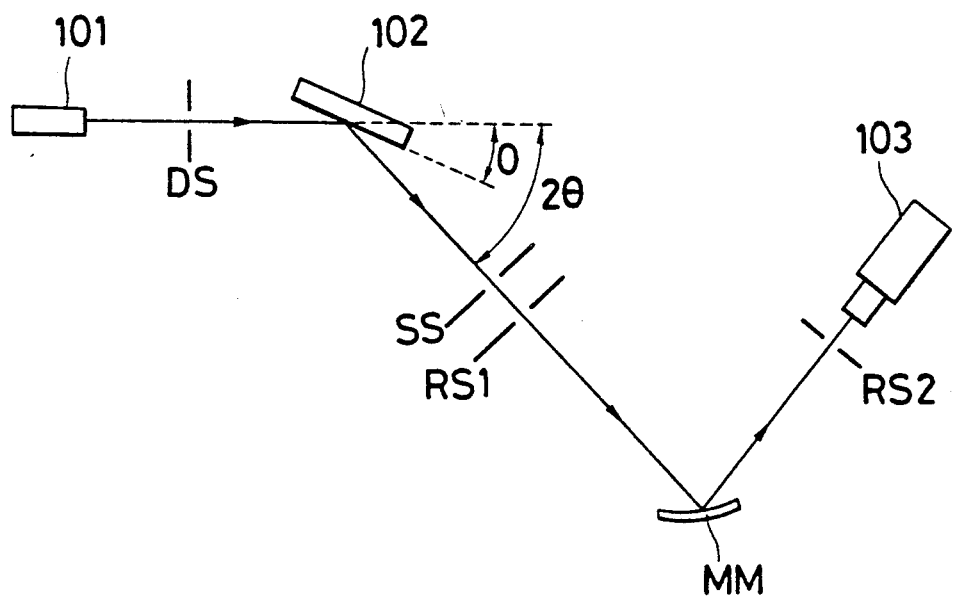
FIG. 2 diagrammatically illustrates the arrangement of an X-ray diffractometer.

Referring to FIG. 2, there is illustrated one typical arrangement of an X-ray diffractometer. An X-ray source 101 emits an X-ray toward the magnetic layer of a magnetic recording medium 102 through a divergent slit DS, where the ray is diffracted. The diffracted X-ray is passed through a scattering slit SS and a receiving slit RS1, reflected by a monochromator MM into monochromatic X-ray, and directed to a counter 103 through a receiving slit RS2 where the intensity of the X-ray is counted and typically recorded by means of a rate meter or the like.

During measurement, the magnetic recording medium 102 is rotated at a scanning rate of $d\theta/dt$ and the scattering slit SS and the light path-defining components downstream of the slit are rotated at a scanning rate of $2d\theta/dt$.

For each of the peaks in the resulting X-ray diffraction chart, the peak area with the background removed is determined by integration, from which the area ratios are calculated.

When measured with the optical arrangement of FIG. 2 which uses CuKα as the X-ray source, the peak of index of plane (104) of $\alpha$-$Fe_2O_3$ appears at approximately 33.3° and the peaks of indexes of plane (400) and (222) of $\gamma$-$Fe_2O_3$ appear at approximately 43.5° and 37.3°. The peak of index of plane (311) of $\gamma$-$Fe_2O_3$ appear in the range of from 35.43° to 35.80° as previously described. The peak position may be determined as the center of gravity of the peak after the background has been removed.

In the magnetic layer, $\alpha$-$Fe_2O_3$ may be evenly distributed although the content of $\alpha$-$Fe_2O_3$ is preferably higher at the surface, that is, on a side remote from the substrate than on a side adjacent to the substrate. The presence of a higher proportion of $\alpha$-$Fe_2O_3$ on the surface reinforces the surface of the magnetic layer which is liable to damages upon sliding contact with the magnetic head. This preferential distribution achieves high durability at the surface while reducing the overall content of $\alpha$-$Fe_2O_3$ throughout the magnetic layer. The content of $\alpha$-$Fe_2O_3$ may be gradually increased toward the magnetic layer surface. An alternative distribution is that $\alpha$-$Fe_2O_3$ is present only at the surface and absent at the substrate adjoining side.

The content of $\alpha$-$Fe_2O_3$ near the magnetic layer surface may be analyzed by the following procedure, for example.

Figure 3:
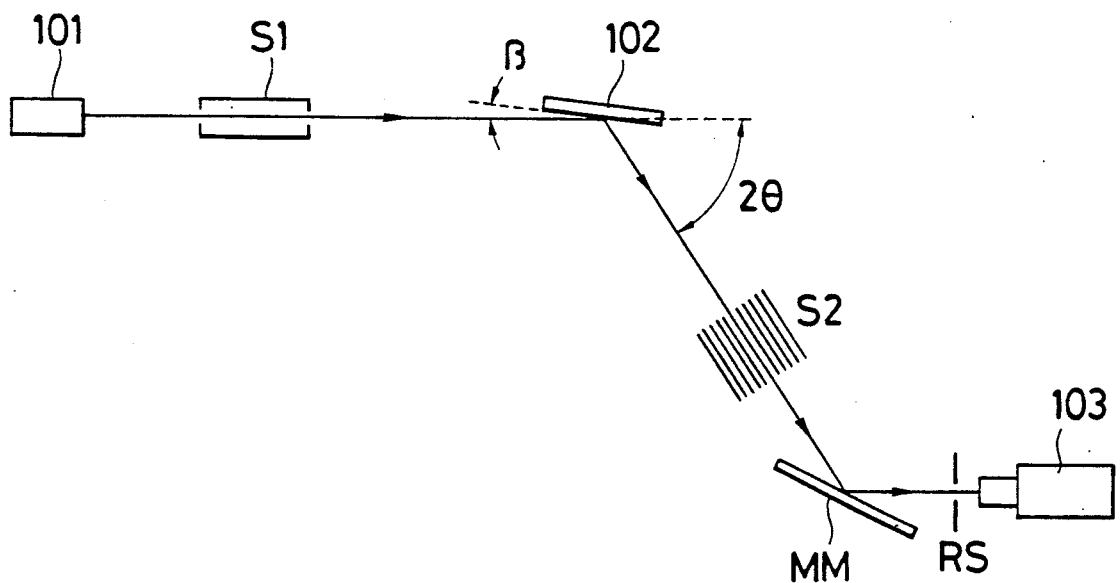
FIG. 3 diagrammatically illustrates the arrangement of a low incident angle X-ray diffractometer.

Referring to FIG. 3, there is illustrated a typical arrangement of a low incident angle X-ray diffractometer. An X-ray source 101 emits an X-ray toward a magnetic recording medium 102 through a solar slit S1. The X-ray is incident on the magnetic layer of the magnetic recording medium 102 at an angle $\beta$ with respect to the magnetic layer surface where the ray is diffracted. The diffracted X-ray is passed through a solar slit S2, reflected by a monochromator MM into monochromatic light, and directed through a receiving slit RS to a counter 103 where the intensity of X-ray is counted.

Unlike the arrangement of FIG. 2, the low incident angle X-ray diffractometer of FIG. 3 is designed such that the magnetic recording medium 102 is fixed relative to the incident X-ray while the solar slit S2 and the light path-defining components downstream thereof are rotated at a scanning rate of $2d\theta/dt$.

The distribution of $\alpha$-$Fe_2O_3$ can be determined by changing the angle $\beta$ between the incident X-ray and the magnetic layer surface. More particularly, portions near the surface can be analyzed by reducing angle $\beta$. The magnetic layer can be analyzed to a deeper section as angle $\beta$ is increased.

In the low incident angle X-ray diffraction analysis, the present invention favors that P(104)/P(311) increases as angle $\beta$ is reduced. For example, the value of P(104)/P(311) measured at an angle $\beta$ of 0.5° is preferably 1.5 to 10 times, more preferably 1.5 to 5 times the value of P(104)/P(311) measured at an angle $\beta$ of 2.0°.

Preferably, the $\gamma$-$Fe_2O_3$ of which the magnetic layer is formed has an average grain diameter of about 100 to about 800 Å, more preferably about 200 to about 500Å. The average grain diameter may be determined through a surface observation using a scanning electron microscope (SEM).

Now, the formation of the magnetic layer is described.

Magnetic thin films predominantly comprising $\gamma$-$Fe_2O_3$ are preferably prepared by first forming $Fe_3O_4$ and then oxidizing it into $\gamma$-$Fe_2O_3$. Formation of $Fe_3O_4$ may be either by a direct process or by an indirect process although the direct process is preferred because of ease of a proper choice of peak area ratios and simplicity.

The direct process is to directly form $Fe_3O_4$ on a substrate by a reactive sputtering technique. The direct process may be classified into three types, an oxidative sputtering in an oxidizing atmosphere using a target of Fe, a reductive sputtering in a reducing atmosphere using a target of $\alpha$-$Fe_2O_3$, and a neutral sputtering in a neutral atmosphere using a target of $Fe_3O_4$. The oxidative sputtering is preferred for the present invention because of ease of sputtering control and a high rate of film formation.

The oxidative sputtering method carries out sputtering in an Ar gas atmosphere having oxygen ($O_2$) gas added as a reactant gas. In order that $\gamma$-$Fe_2O_3$ exhibit the above-defined peak area ratios in an X-ray diffraction diagram, the partial pressure $P_{O2}$ of oxygen gas and the total pressure $P_{(Ar+O2)}$ of argon and oxygen gases are preferably controlled to meet the equation:

$$0.043 \leq P_{O2}/P_{(Ar+O2)} \leq 0.073,$$

more preferably $$0.048 \leq P_{O2}/P_{(Ar+O2)} \leq 0.069.$$

In sputtering, oxygen is preferably introduced into a vacuum chamber by blowing oxygen gas against the substrate. The total pressure $P_{(Ar+O2)}$ is preferably controlled to the range of from $1\times10^{-4}$ to $1\times10^{-2}$ Torr, more preferably from $5\times10^{-4}$ to $8\times10^{-3}$ Torr.

In order that the magnetic layer have a resistivity in the above-defined range, the total flow rate of argon and oxygen gases is preferably controlled to the range of about 30 to 150 standard cubic centimeter per minute (SCCM), more preferably about 70 to 140 SCCM.

The preferred sputtering method is RF sputtering. The sputtering power is not critical, but is preferably in the range of 0.2 to 2 kilowatts (kW), more preferably 0.4 to 1.5 kW.

The detail of the formation of $Fe_3O_4$ thin film by the direct process is described in Densi Tusin Gakkai Ronbun.Si (Journal of the Japanese Electronic Communications Society), '80/9, Vol. J63-C, No. 9, pages 609–616. It is recommended to form a magnetic layer in accordance with the teaching of this article while sputtering is effected with the controlled gas flow rates and oxygen partial pressure.

The indirect process is by sputtering an Fe target in an oxidizing atmosphere to form $\alpha$-$Fe_2O_3$ and reducing it into $Fe_3O_4$. The $Fe_3O_4$ film formed by sputtering is finally oxidized into $\gamma$-$Fe_2O_3$. Forming a magnetic thin film by the indirect process is also contemplated in the present invention.

Once $Fe_3O_4$ has been formed by sputtering either directly or indirectly, the next step is to oxidize it to the gamma form, $\gamma$-$Fe_2O_3$. Oxidation is preferably carried out by a heat treatment in an atmosphere having an oxygen partial pressure of about 0.05 to 0.8 atm. and a total pressure of about 0.5 to 2 atm., typically in the ambient air. The heat treatment may be at a holding temperature of about 200° to 400° C., especially about 250° to 350° C. for about 10 minutes to about 10 hours, especially about 1 to 5 hours.

In initiating the heat treatment, the temperature is preferably increased to the holding temperature at a rate of 3.5 to 20° C./min., especially 5.0 to 12° C./min. By controlling the heating rate to this range, the above-defined peak area ratio associated with $\alpha Fe_2O_3$ can be readily obtained. The heating rate may be constant, or gradually increased or decreased. A schedule of different heating rates may be used until the holding temperature is reached.

The thus formed magnetic layer generally has a good profile of magnetic properties, including a coercive force of from about 400 to 2,500 Oe, a remanence or residual magnetization of from about 2,000 to 3,000 G, and a squareness ratio of from about 0.55 to 0.85 though they depend on the content of Co added (to be described below) and the value of resistivity $\rho$. These magnetic properties are little affected by inclusion of $\alpha Fe_2O_3$.

The magnetic thin film may contain an additional element such as Co, Ti, and Cu in addition to the gamma-iron oxide and optional alpha-iron oxide if desired. It will be understood that argon or other elements in the film forming atmosphere can be entrained in the magnetic thin film.

Inclusion of cobalt is effective for controlled coercive force. Cobalt is preferably present in an amount to substitute for up to 10% by weight of Fe. An iron target containing Co may be used in sputtering when it is desired that the magnetic layer contain Co.

The magnetic layer is preferably about 500 to about 3,000 Å thick for productivity and magnetic properties.

The magnetic layer 3 on the upper surface 13 remote from the substrate 2 (see FIG. 1) has a surface roughness Rmax of 50 to 200 Å. Within this range of surface roughness Rmax, clinging of the flying magnetic head to the magnetic recording medium does not occur. Stable recording/reproducing operation is always ensured even when the distance of the floating (or air bearing) surface of the flying magnetic head from the medium surface is as small as 0.1 $\mu$m or less. Efficient high density recording is possible.

In order that the magnetic layer have a surface roughness Rmax in the specific range, the film forming process may be properly modified. For example, the Rmax may be controlled by selecting the temperature and time of the heat treatment in air for oxidizing $Fe_3O_4$ into $\gamma$-$Fe_2O_3$.

Lubricating layer

In a preferred embodiment, a lubricating film 4 is formed on the magnetic layer 3 as shown in FIG. 1.

The lubricating film preferably contains an organic compound, especially an organic compound having a polar group or a hydrophilic group or moiety. The organic compounds used as the lubricating film are not critical to the present invention. They may be either liquid or solid and include organofluoro compounds, for example, perfluoropolyethers as described in EP Publication Nos. 0165649 and 0165650, well-known various fatty acids, esters, and alcohols.

The method of forming the lubricating film is not critical. Any desired application methods, typically coating may be used.

The lubricating film on the surface preferably has a contact angle with water of at least 70°, more preferably at least 90°. The lubricating film having such a contact angle is effective in preventing the magnetic head from clinging to the medium.

The thickness of the lubricating film is usually in the range of about 4 to about 300 Å although it varies with a particular film forming method and a particular compound. Lubricating films of thinner than 4 Å are ineffective for lubrication and durability. Lubricating films of up to 300 Å thick are effective in minimizing clinging and magnetic head crash. The preferred thickness is in the range of 4 to 100 Å, especially 4 to 80 Å.

The lubricating film within the thickness range defined above substantially reproduces the surface roughness Rmax of the magnetic thin film on the lubricating surface. Broadly stated, the magnetic recording medium of the present invention has a surface roughness Rmax of 50 to 200 Å on the outer surface. The preferred range of Rmax is from 80 to 150 Å, more preferably from 80 to 120 Å, especially from 90 to 120 Å.

Magnetic head

The magnetic recording medium of the present invention may perform effective recording/reproducing operation in combination with any well-known magnetic heads including flying magnetic heads of the composite and monolithic types. Better results are obtained when the medium is operated with flying magnetic heads of the thin film type.

Figure 4:
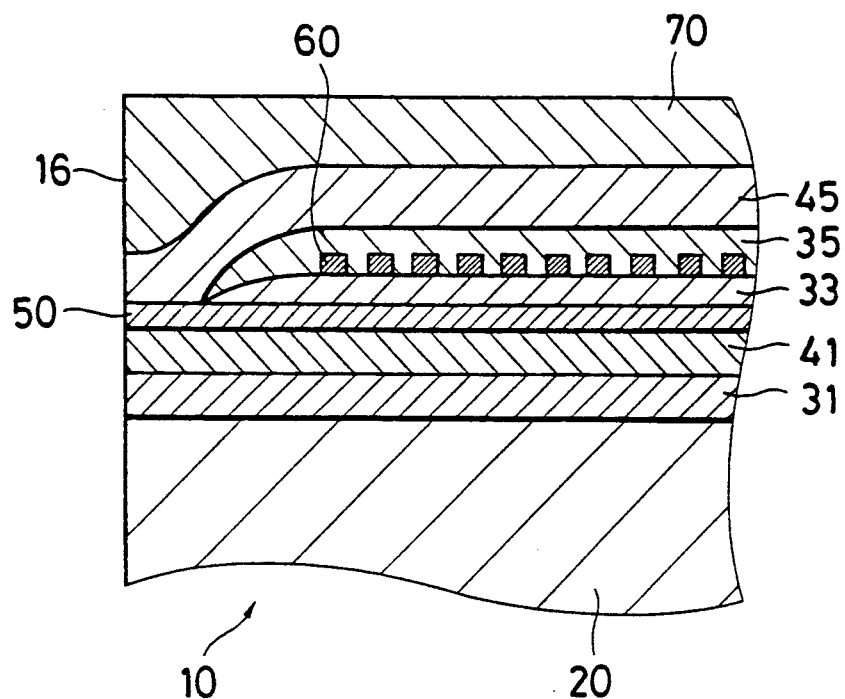
FIG. 4 is a cross section of a portion of a magnetic head used in the method of the present invention.

FIG. 4 is a cross section of a portion of a flying magnetic head of the thin film type for use in a preferred embodiment of the present invention. The flying magnetic head generally designated at 10 includes a base 20, a first insulating layer 31, a lower pole layer 41, a gap layer 50, a second insulating layer 33, a coil layer 60, a third insulating layer 35, and an upper pole layer 45, and a protective layer 70 stacked in this order. The base 20 and the layers define a floating (air bearing) surface 16 at one end. A lubricating film may be applied to the floating surface 16 of the head 10 if desired. Such a lubricating film may be the same as previously described for the magnetic recording medium.

The head on the floating surface has a surface roughness Rmax in the range of up to 200 Å, preferably 50 to 150 Å. Better performance is expectable when a magnetic recording medium having a specific surface roughness Rmax is operated with a head having a specific surface roughness Rmax.

The coil layer 60 may be formed from any desired material, generally from a metal such as aluminum and copper. No particular limits are imposed on the pattern and density of the coil. The coil may be wound in a well-known conventional manner. For example, the coil pattern may be of the spiral type illustrated in FIG. 4, laminate type or zigzag type. The coil layer 60 may be formed by any desired vapor phase deposition techniques including sputtering or wet plating techniques.

The base 20 may be formed from any well-known materials including Mn-Zn ferrite. The base is preferably formed from ceramic materials having a Vickers hardness of at least about 1,000 kgf/mm², more preferably about 1,000 to about 3,000 kgf/mm², particularly when the magnetic head is used in combination with a magnetic recording medium having a continuous thin film type magnetic layer predominantly comprising iron oxide according to the invention.

Examples of ceramic materials having a Vickers hardness of at least about 1,000 kgf/mm$^2$ include Al$_2$O$_3$-TiC base ceramic materials, ZrO2 base ceramic materials, SiC base ceramic materials, and AlN base ceramic materials. They may contain an additional component(s) such as Mg, Y, ZrO$_2$, and TiO$_2$. Preferred among them are Al$_2$O$_3$-TiC base ceramic materials, SiC base ceramic materials, and AlN base ceramic materials. The Al$_2$O$_3$.TiC base ceramic materials are most preferred for their hardness relative to the hardness of magnetic thin films of iron oxide.

The lower and upper pole layers 41 and 45 may be formed from any well-known materials including Permalloy, Sendust, and amorphous magnetic cobalt base alloys. The magnetic poles are usually provided separately as shown by the lower and upper pole layers 41 and 45 in FIG. 4.

The gap layer or spacer 50 intervenes between the lower and upper pole layers 41 and 45. The gap layer 50 may be formed from any well-known materials including Al$_2$O$_3$ and SiO$_2$.

The magnetic pole layers 41, 45 and the gap layer 50 may be of conventional well-known design with respect to their pattern, thickness and the like.

In the illustrated embodiment, the coil layer 60 is spirally disposed between the lower and upper pole layers 41 and 45 while the insulating layers 33 and 35 intervene between the coil layer 60 and the lower and upper pole layers 41 and 45. The insulating layer 31 is disposed between the base 20 and the lower pole layer 41. These insulating layers may be formed from any well-known materials. For example SiO$_2$, glass, and Al$_2$O$_3$ may be used when it is desired to form an insulating thin film by sputtering.

The protective layer 70 is present on the top of the head, more specifically on the upper pole layer 45. The protective layer 70 may be formed from any well-known materials, for example, Al$_2$O$_3$. An additional resinous coating may be applied to the protective layer.

Briefly stated, the process for producing such a thin film type flying magnetic head includes thin film formation and patterning. To form thin films which constitute the respective layers as described above, any well-known vapor phase deposition and wet deposition techniques may be used, for example, vacuum deposition, sputtering, and plating. Patterning of the respective layers of the head may be carried out by selective etching or selective deposition, which are both well known in the art. The etching may be either wet or dry etching.

The flying magnetic head as far described is usually combined with well-known members such as an arm to form a head assembly.

Recording and reproducing operation on the magnetic recording medium of the present invention, particularly in the form of a magnetic disk, may be carried out by rotating the disk while keeping the head afloat. The disk is usually rotated at about 2,000 to about 6,000 revolutions per minute (r.p.m.), especially about 2,000 to about 4,000 r.p.m. The distance or spacing of the flying head away from the disk surface is usually set to at most 0.2 μm, preferably at most 0.15 μm, more preferably at most 0.1 μm. A typical spacing in the range of from 0.01 to 0.09 μm is effective for flying performance and CSS durability. The flying distance may be adjusted by changing the slider width and head load.

EXAMPLE

Examples of the present invention are given below by way of illustration and not by way of limitation.

EXAMPLE 1

Preparation of Magnetic Disk Samples

An annular substrate of aluminosilicate glass having an outer diameter of 130 mm, an inner diameter of 40 mm and a thickness of 1.9 mm was polished on one major surface. It was then chemically strengthened by dipping in molten potassium nitrate at 450° C. for 10 hours. The glass substrate was further smoothed on the surface by mechanochemical polishing with abrasive liquid containing colloidal silica. At the end of polishing, the glass substrate had a surface roughness Rmax of 50 Å as measured by a probe type surface roughness meter. It was then washed.

A magnetic thin film was then formed on the surface of the smoothed glass substrate. The target used was of 1.0 wt% CO-Fe alloy. Preliminary sputtering was carried out in an argon gas atmosphere to remove an oxide film from the target surface. Reactive sputtering was then carried out by introducing oxygen (O$_2$) gs into the atmosphere so as to blow against the substrate, depositing a thin Fe$_3$O$_4$ film. The oxygen partial pressure and the total pressure were controlled such that $P_{(Ar+O2)}$ was equal to $1 \times 10^{-3}$ Torr and $P_{O2}P_{(Ar+O2)}$ was equal to 0.052. The total flow rate of Ar and O$_2$ gases fed during deposit on of Fe$_3$O$_4$ film is reported in Table 1.

The Fe$_3$O$_4$ film was then oxidized into γ-Fe$_2$O$_3$ by a heat treatment in air. The film was heated to a temperature of 310° C. at a rate of 8.0° C./min. and held at the temperature for one hour in air.

There were obtained a series of magnetic disk samples having a magnetic layer of γ-Fe$_2$O$_3$ having a thickness of 2,000 Å.

The magnetic layer of each disk sample was analyzed for X-ray diffraction to draw an X-ray diffraction chart using an optical arrangement as shown in FIG. 2. The analytical results of an X-ray diffraction chart of each sample are reported in Table 1.

Figure 6:
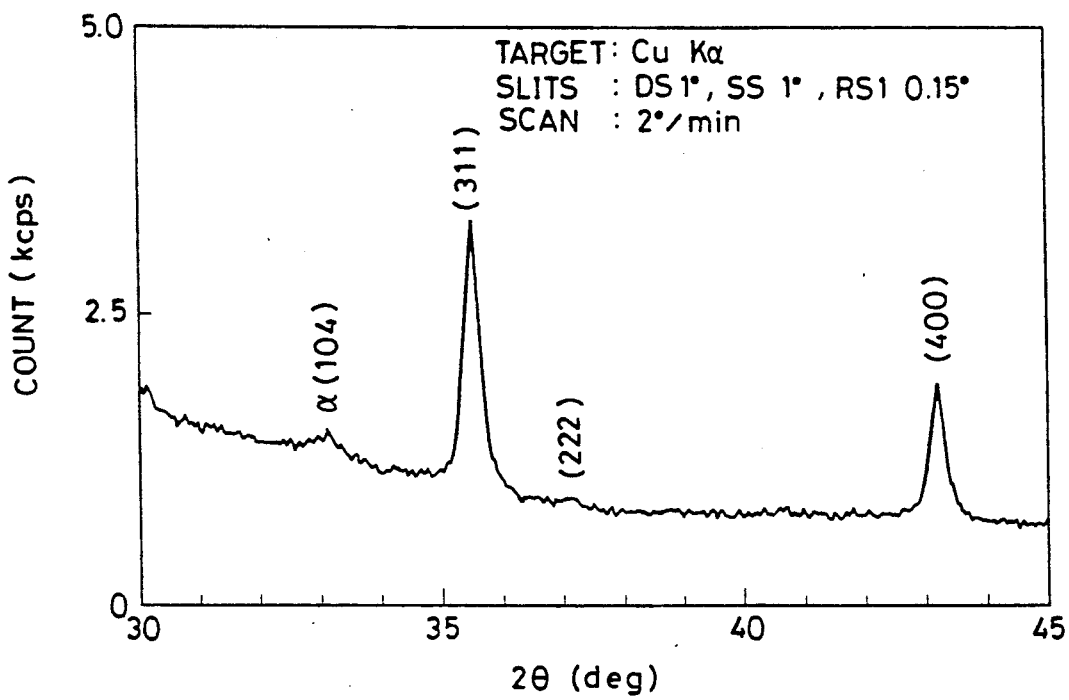
FIG. 6 is an X-ray diffraction chart of a $\gamma$-$Fe_2O_3$ magnetic layer of sample No. 4 in Example 1.

FIG. 6 is an X-ray diffraction chart of sample No. 4.

Figure 7:
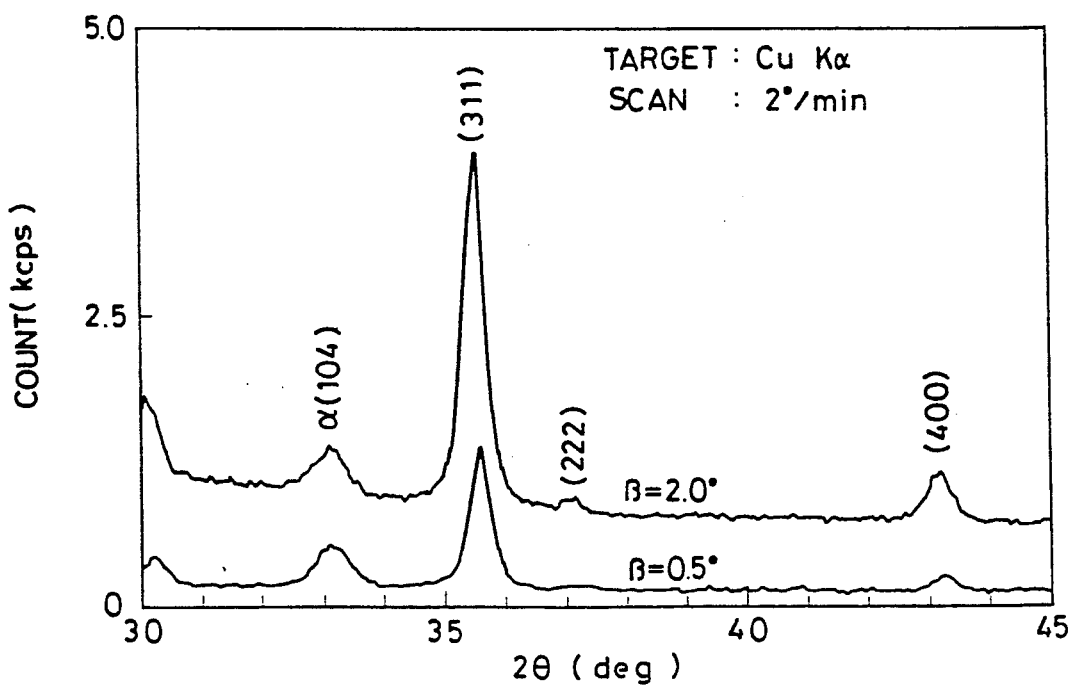
FIG. 7 is an X-ray diffraction chart of a $\gamma$-$Fe_2O_3$ magnetic layer of sample No. 4 in Example 1 as measured by a low incident angle X-ray diffractometer.

The magnetic layer of sample No. 4 was further analyzed for X-ray diffraction by means of a low incident angle X-ray diffractometer as shown in FIG. 3 with angle settings of $\beta=0.5°$ and $\beta=2.0°$. FIG. 7 shows X-ray diffraction charts of sample No. 4 at the low incident angles. As seen from FIG. 7, the value of P(104)/P(311) at $\beta=0.5°$ is approximately 2.6 times the value of P(104)/P(311) at $\beta=2.0°$, indicating that more γ-Fe$_2$O$_3$ was present on the surface side of the magnetic layer.

Similar results were obtained when the remaining samples of Table 1 were analyzed for X-ray diffraction.

The magnetic layer of each sample had an average grain size of 100 to 800 Å.

The samples were further determined for the following properties.

Resistivity ρ

Resistivity was measured by a four-point probe method under the following conditions.
Probe material: titanium carbide
Probe spacing: 1 mm Probe tip radius: 40 μm
Applied pressure: 100 g/probe

Coercive force Hc

Coercive force was measured by a vibrating sample magnetomer (VSM). The maximum magnetic field applied was 5 kOe.

Reproduction output

After a lubricating film was applied to the magnetic layer of each sample, the sample was measured for reproduction output and D70 by operating the sample in combination with a thin film magnetic head (to be described later) at a flying distance of 0.1 μm. The reproduction output was determined by recording and reproducing signals at a 21 kilo flux change per inch (kFCI) and evaluated according to the following ratings.

○: practically satisfactory output
◯: practically acceptable output
X: practically unacceptable output D70 is a recording density expressed in kFCI at which the reproduced output is reduced to 70% of the reproduced output at a low recording density.

The lubricating film was formed on the magnetic layer as follows. A solution containing 0.1% by weight of the compound of the formula:

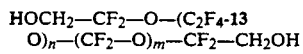

HOCH$_2$—CF$_2$—O—(C$_2$F$_4$-13
O)$_n$—(CF$_2$—O)$_m$—CF$_2$—CH$_2$OH having a molecular weight of 2,000 was applied to the magnetic layer by spin coating to a thickness of 20 Å. The lubricating film had a contact angle with water of 100° as measured after 30 seconds from dropwise application of water. After formation of the lubricating film, each sample had a surface roughness Rmax of 100 Å on the magnetic layer side.

Magnetic Head

A flying magnetic head of the air bearing type was prepared by successively forming necessary thin film elements on a Al$_2$O$_3$-TiC base having a Vickers hardness of 2200 kgf/mm$^2$, processing to the desired head configuration, and mounting the head to a spring support known as a gimbal. The head had a surface roughness Rmax of 130 Å on the floating surface.

The head was designed to provide a flying height of 0.1 μm by adjusting the slider width and gimbal load.

The results are shown in Table 1.

are available with in the range $0.03 \leq \rho \leq 3.0$. as $\rho$ exceeds 0.03 Ω-cm, the coercive force exceeds the current coercive force limit of about 400 Oe available with γ-Fe$_2$O$_3$ containing 1 wt% Co as reported in Tuken Jippo (communications Research Laboratory Report), Vol. 31, No. 1 (1982), pages 277–289. Both the coercive force and D70 increases as $\rho$ increases. However, the reproduced output is reduced to a practically unacceptable level if $\rho$ exceeds 3.0 Ω-cm. D70 becomes as high as 30 kFCI or more and the reproduced output becomes fully satisfactory within the range $0.1 \leq \rho \leq 0.9$.

EXAMPLE 2

Magnetic disk samples were prepared according to the procedure and parameters of sample No. 5 in Example 1. With respect to the formation of the magnetic layer, the conditions for formation of Fe$_3$O$_4$ and subsequent oxidation of Fe$_3$O$_4$ into α-Fe$_2$O$_3$ were changed as shown in Table 2. Also the surface roughness Rmax was changed as shown in Table 2 on both the substrate and the magnetic layer side surface.

The magnetic disk samples were measured for sliding durability and reproduced output.

Sliding durability

A sliding durability test was conducted at 25° C. and RH 50%. The magnetic head used was the same as used in Example 1. The magnetic disk was kept in continuous sliding contact with the head by setting a slider width of 150 μm and a gimbal load ob 25 grams. The magnetic head was forced in contact with the magnetic disk, which was rotated at a relative speed of 20 m/sec. An acoustic emission (AE) sensor was used to observe that the head was in continuous contact with the disk without floating. Durability was evaluated in terms of the time taken until the magnetic disk was damaged. Table 2 reports the durability time in a relative value provided that the durability time of sample No. 101 is 100.

It should be noted that this sliding durability test is a more severe durability test than the CSS durability test.

Reproduced output

A loss of reproduced output due to inclusion of α-Fe$_2$O$_3$ was determined. Evaluation was made according to the following ratings on a relative basis that the reproduced output of sample No. 111 which was free of α-Fe$_2$O$_3$ was 100.

◯: 90 or higher
X: lower than 90

The results are shown in Table 2.

TABLE 1

| Sample No. | Ar + O$_2$ (sccm) | $\rho$ (Ω · cm) | Hc (Oe) | Reproduced output | D$_{70}$ (kFCI) | (311) peak at (°) | P(104)/P(311) | P(400)/P(311) | P(222)/P(311) |
|---|---|---|---|---|---|---|---|---|---|
| 1* | 15 | 0.01 | 320 | X | 13 | 35.35 | 0.10 | 0.53 | 0.00 |
| 2 | 30 | 0.03 | 480 | ◯ | 22 | 35.43 | 0.10 | 0.50 | 0.02 |
| 3 | 60 | 0.08 | 800 | ◯ | 28 | 35.52 | 0.10 | 0.49 | 0.02 |
| 4 | 70 | 0.10 | 880 | ⊙ | 30 | 35.53 | 0.10 | 0.48 | 0.03 |
| 5 | 120 | 0.42 | 1550 | ⊙ | 35 | 35.63 | 0.09 | 0.48 | 0.00 |
| 6 | 135 | 0.88 | 1970 | ⊙ | 38 | 35.70 | 0.10 | 0.40 | 0.04 |
| 7 | 148 | 2.85 | 2300 | ◯ | 40 | 35.79 | 0.11 | 0.43 | 0.04 |
| 8* | 160 | 5.60 | 2450 | X | 41 | 35.84 | 0.10 | 0.38 | 0.06 |

*outside the scope of the invention

As seen from the data of Table 1, coercive force Hc and D70 increase with resistivity $\rho$. High D70 values

TABLE 2

| Sample No. | Fe₃O₄ Film Formation | | P(400)/P(311) | P(222)/P(311) | Heating rate (°C./min) | P(104)/P(311) | Heat treatment | | Magnetic layer side Rmax (Å) | Substrate surface Rmax (Å) | ρ (Ω·cm) | Sliding durability | Reproduced output |
|---|---|---|---|---|---|---|---|---|---|---|---|---|---|
| | P (Ar + O₂) (Torr) | P O₂/P (Ar + O₂) (%) | | | | | Temp. (°C.) | Time (hr) | | | | | |
| 101 | 1 × 10⁻³ | 5.2 | 0.42 | 0 | 8.0 | 0.10 | 310 | 1 | 100 | 50 | 0.42 | 100 | ○ |
| 102 | 1 × 10⁻³ | 6.6 | 0.06 | 0.21 | 8.0 | 0.10 | 315 | 1.5 | 110 | 45 | 0.50 | 100 | ○ |
| 103 | 1 × 10⁻³ | 5.6 | 0.23 | 0.04 | 8.0 | 0.10 | 300 | 1.5 | 70 | 30 | 0.44 | 92 | ○ |
| 104 | 1 × 10⁻³ | 6.5 | 0.06 | 0.20 | 8.0 | 0.10 | 290 | 3 | 40 | 5 | 0.50 | 65 | ○ |
| 105 | 1 × 10⁻³ | 4.6 | 0.77 | 0 | 8.0 | 0.10 | 310 | 1 | 100 | 50 | 0.40 | 87 | ○ |
| 106 | 1 × 10⁻³ | 7.1 | 0.06 | 0.40 | 8.0 | 0.09 | 310 | 1 | 100 | 50 | 0.55 | 85 | ○ |
| 107 | 1 × 10⁻³ | 4.2 | 1.10 | 0 | 8.0 | 0.10 | 310 | 1 | 100 | 50 | 0.38 | 65 | ○ |
| 108 | 1 × 10⁻³ | 8.1 | 0.10 | 1.14 | 8.0 | 0.09 | 310 | 1 | 100 | 50 | 0.55 | 60 | ○ |
| 109 | 1 × 10⁻³ | 6.0 | 0.12 | 0.10 | 8.0 | 0.10 | 310 | 2 | 130 | 70 | 0.46 | 90 | ○ |
| 110 | 1 × 10⁻³ | 5.3 | 0.36 | 0 | 8.0 | 0.10 | 315 | 5 | 250 | 120 | 0.44 | 65 | ○ |
| 111 | 1 × 10⁻³ | 5.8 | 0.16 | 0.06 | 2.0 | 0 | 310 | 1 | 100 | 50 | 0.45 | 65 | ○ |
| 112 | 1 × 10⁻³ | 5.8 | 0.16 | 0.06 | 3.0 | 0.01 | 310 | 1 | 100 | 50 | 0.45 | 70 | ○ |
| 113 | 1 × 10⁻³ | 5.8 | 0.16 | 0.06 | 5.0 | 0.04 | 310 | 1 | 100 | 50 | 0.45 | 83 | ○ |
| 114 | 1 × 10⁻³ | 5.8 | 0.16 | 0.06 | 7.5 | 0.075 | 310 | 1 | 100 | 50 | 0.45 | 100 | ○ |
| 115 | 1 × 10⁻³ | 5.8 | 0.16 | 0.06 | 11.0 | 0.12 | 310 | 1 | 100 | 50 | 0.47 | 100 | ○ |
| 116 | 1 × 10⁻³ | 5.8 | 0.16 | 0.06 | 17.0 | 0.18 | 310 | 1 | 100 | 50 | 0.50 | 92 | ○ |
| 117 | 1 × 10⁻³ | 5.8 | 0.16 | 0.06 | 30.0 | 0.25 | 310 | 1 | 100 | 50 | 0.55 | 75 | X |

All the samples were subjected to a CSS durability test to find a similar tendency to the sliding durability test.

The foregoing data demonstrated the effectiveness of the invention.

There has been described a magnetic recording medium comprising a rigid substrate and a magnetic layer of predominantly $\gamma$-Fe$_2$O$_3$ having a resistivity of 0.03 to 3 $\Omega$-cm. The magnetic layer is excellent in durability, especially in CSS durability and severe sliding durability and advantageous because of a high recording density.

The magnetic recording medium of the invention has been described as a single side recording medium, but is not limited thereto. A double side recording medium having a magnetic layer on each major surface of a substrate is also contemplated herein.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic recording medium comprising a rigid substrate, formed of glass, having a pair of opposed major surfaces and a layer of continuous magnetic thin film on at least one major surface predominantly comprising $\gamma$-Fe$_2$O$_3$, characterized in that the magnetic layer has a resistivity in the range of from 0.03 to 3 $\Omega$-cm.

2. The magnetic recording medium of claim wherein the peak corresponding to an index of plane (311) of $\gamma$-Fe$_2$O$_3$ appears at from 35.43° to 35.80° in an X-ray diffraction chart of the magnetic layer.

3. The magnetic recording medium of claim 1 wherein the magnetic layer has an average grain diameter of from 100 to 800 Å.

4. The magnetic recording medium of claim 1 wherein the magnetic layer meets the following conditions:

$$0 \leq P(400)/P(311) \leq 1.0 \text{ and}$$

$$0 \leq P(222)/P(311) \leq 0.5$$

wherein P(311), P(400), and P(222) are peak areas at indexes of plane (311), (400) and (222) of $\gamma$-Fe$_2$O$_3$, respectively, in an X-ray diffraction chart of the magnetic layer.

5. The magnetic recording medium of claim 1 wherein said magnetic layer further comprises $\alpha$-Fe$_2$O$_3$.

6. The magnetic recording medium of claim 5 wherein in said magnetic layer, the content of $\alpha$-Fe$_2$O$_3$ is higher on a side remote from the substrate than on a side adjacent to the substrate.

7. The magnetic recording medium of claim 5 or 6 wherein the magnetic layer meets the following conditions:

$$0.02 \leq P(104)/P(311) \leq 0.20,$$

$$0 \leq P(400)/P(311) \leq 1.0, \text{ and}$$

$$0 \leq P(200)/P(311) \leq 0.5$$

wherein P(311), P(400), and P(222) are peak areas at indexes of plane (311), (400) and (222) of $\gamma$-Fe$_2$O$_3$ and P(104) is a peak area at an index of plane (104) of $\alpha$-Fe$_2$O$_3$ in an X-ray diffraction chart of the magnetic layer.

8. The magnetic recording medium of claim 1 wherein said substrate has a surface roughness (Rmax) in the range of from 10 to 100 Å on at least one of the pair of opposed major surfaces and said medium has a surface roughness (Rmax) in the range of from 50 to 200 Å on an outer surface adjacent to the magnetic layer.

9. The magnetic recording medium of claim 1 which further comprises a lubricating layer containing an organic compound on the magnetic layer.

10. The magnetic recording medium of claim 1 wherein said magnetic layer further comprises cobalt.

11. A method for recording and reproducing information in a magnetic recording medium comprising a rigid substrate, formed of glass, having a pair of opposed major surfaces and a layer of continuous magnetic thin film on at least one major surface predominantly comprising $\alpha$-Fe$_2$O$_3$, wherein the layer of continuous magnetic thin film has a resistivity in the range of from 0.03 to 3 $\Omega$-cm, the method comprising the step of rotating the magnetic recording medium in close proximity to a flying magnetic head, wherein said magnetic recording medium is a rotating magnetic disk and the flying magnetic head is kept at a spacing of up to 0.2 $\mu$m from the rotating magnetic disk.

* * * * *

UNITED STATES PATENT AND TRADEMARK OFFICE
CERTIFICATE OF CORRECTION

PATENT NO. : 5,094,896
DATED      : March 10, 1992
INVENTOR(S): Haruyuki Morita et al.

It is certified that error appears in the above-identified patent and that said Letters Patent is hereby corrected as shown below:

On Title page, item [30],

The foreign application priority data has been omitted, should be, -- November 8, 1989 [JP] Japan.......1-290925--.

Signed and Sealed this

First Day of June, 1993

Attest:

MICHAEL K. KIRK

*Attesting Officer*     Acting Commissioner of Patents and Trademarks